(12) United States Patent
Hertling et al.

(10) Patent No.: US 11,161,295 B2
(45) Date of Patent: Nov. 2, 2021

(54) THREE-DIMENSIONAL PRINTER WITH A SUPPORTING ELEMENT INSERTION APPARATUS

(71) Applicant: Hewlett-Packard Development Company, L.P., Houston, TX (US)

(72) Inventors: William E. Hertling, Portland, OR (US); Melanie Robertson, Camas, WA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 171 days.

(21) Appl. No.: 16/069,803

(22) PCT Filed: Apr. 29, 2016

(86) PCT No.: PCT/US2016/030155
§ 371 (c)(1),
(2) Date: Jul. 12, 2018

(87) PCT Pub. No.: WO2017/188997
PCT Pub. Date: Nov. 2, 2017

(65) Prior Publication Data
US 2019/0039284 A1 Feb. 7, 2019

(51) Int. Cl.
*B29C 64/118* (2017.01)
*B29C 70/70* (2006.01)
(Continued)

(52) U.S. Cl.
CPC .......... *B29C 64/118* (2017.08); *B29C 64/386* (2017.08); *B29C 70/70* (2013.01);
(Continued)

(58) Field of Classification Search
CPC ..... B29C 61/118; B29C 64/386; B29C 70/70; B33Y 10/00; B33Y 50/02
See application file for complete search history.

(56) References Cited

U.S. PATENT DOCUMENTS 7,790,074 B2  9/2010 Pan et al.
8,318,076 B2  11/2012 Wang et al.
(Continued)

FOREIGN PATENT DOCUMENTS

WO  WO-2014111958  7/2014

OTHER PUBLICATIONS

International Search Report and Written Opinion dated Jan. 26, 2017, PCT Patent Application No. PCT/US2016/030155, filed Apr. 29, 2016, Korean Intellectual Property Office, 13 pages.
(Continued)

*Primary Examiner* — Kelly M Gambetta

(57) ABSTRACT

According to an example, in a method for forming a three-dimensional (3D) printed object, a plurality of layers of the 3D printed object and a channel that extends through the plurality of layers may be formed, in which the plurality of layers is formed of a first material. In addition, a supporting element may be inserted into the channel such that the supporting element extends through multiple layers of the plurality of layers, in which the supporting element is formed of a second material that differs from the first material.

9 Claims, 4 Drawing Sheets

(51) Int. Cl.
*B33Y 50/02* (2015.01)
*B33Y 10/00* (2015.01)
*B33Y 30/00* (2015.01)
*B29C 64/386* (2017.01)

(52) U.S. Cl.
CPC .............. *B33Y 10/00* (2014.12); *B33Y 30/00* (2014.12); *B33Y 50/02* (2014.12)

(56) References Cited

U.S. PATENT DOCUMENTS

| | | |
|---|---|---|
| 2004/0175451 A1 | 9/2004 | Maekawa et al. |
| 2009/0174709 A1* | 7/2009 | Kozlak .................. G06F 30/00 345/420 |
| 2014/0121813 A1* | 5/2014 | Schmehl ............... B29C 64/106 700/119 |
| 2015/0239179 A1 | 8/2015 | Goto et al. |
| 2015/0259099 A1 | 9/2015 | Segal |
| 2015/0266244 A1* | 9/2015 | Page .................... B29C 64/118 425/78 |
| 2015/0352783 A1 | 12/2015 | Snyder et al. |

OTHER PUBLICATIONS

Peng Song, et al., "Printing 3D Objects with Interlocking Parts", Mar. 19, 2015, 14 pages. http://staff.ustc.edu.cn/~songpeng/paers/2015-GMP-InterlockObject.pdf.

* cited by examiner

300

```
FORM PLURALITY OF LAYERS WHILE FORMING A
CHANNEL THAT EXTENDS THROUGH THE LAYERS
302
```

↓

```
INSERT SUPPORTING ELEMENT INTO THE CHANNEL
304
```

```
FORM PLURALITY OF LAYERS WHILE FORMING A
CHANNEL THAT EXTENDS THROUGH THE LAYERS
402
```

↓

```
DETERMINE LOCATION OF THE CHANNEL
404
```

↓

```
INSERT SUPPORTING ELEMENT INTO THE CHANNEL
406
```

↓

ADDITIONAL LAYERS? 408 — YES → (loops back) / NO → END 410

*FIG. 4* though, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

THREE-DIMENSIONAL PRINTER WITH A SUPPORTING ELEMENT INSERTION APPARATUS

CLAIM FOR PRIORITY

The present application is a national stage filing under 35 U.S.C. § 371 of PCT application number PCT/US2016/030155, having an international filing date of Apr. 29, 2016, the disclosure of which is hereby incorporated by reference in its entirety.

BACKGROUND

In three-dimensional (3D) printing, an additive printing process is often used to make three-dimensional solid parts from a digital model. 3D printing is often used in rapid product prototyping, mold generation, mold master generation, and short run manufacturing. Some 3D printing techniques, such as fused deposition modeling (FDM) are considered additive processes because they involve the application of successive layers of material. This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of the present disclosure are illustrated by way of example and not limited in the following figure(s), in which like numerals indicate like elements, in which:

FIGS. 3 and 4, respectively, depict flow diagrams of methods for forming 3D printed object.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are a 3D printer and methods for implementing the 3D printer to form a 3D part (or equivalently, a 3D object). Particularly, the 3D printer disclosed herein may include a first material deposition apparatus and a supporting element insertion apparatus. The first material deposition apparatus may be implemented in the formation of a plurality of layers of a first material and a channel may be formed in a subset of the plurality of layers. In addition, the supporting element insertion apparatus may insert a second material into the channel to form a supporting element (or equivalently, a supporting member), in which the second material differs from the first material. In one example, the second material may be relatively stronger than the first material to provide additional structural support to the 3D part formed from the first material.

As discussed in greater detail herein, the second material may be inserted into the channel in a liquid form, a gel form, or a solid form. When inserted in liquid or gel form, the second material may be hardened through application of heat, light, and/or exposure to ambient air. As the supporting element may be relatively stronger than the first material, the supporting element may also provide additional support in the direction perpendicular to the direction in which the layers of the first material are formed. Additionally, an adhesive and/or epoxy may be used to bond the supporting element to the layers of the first material, thereby providing greater structural bonding between adjacent layers of the first material.

Figure 1A:
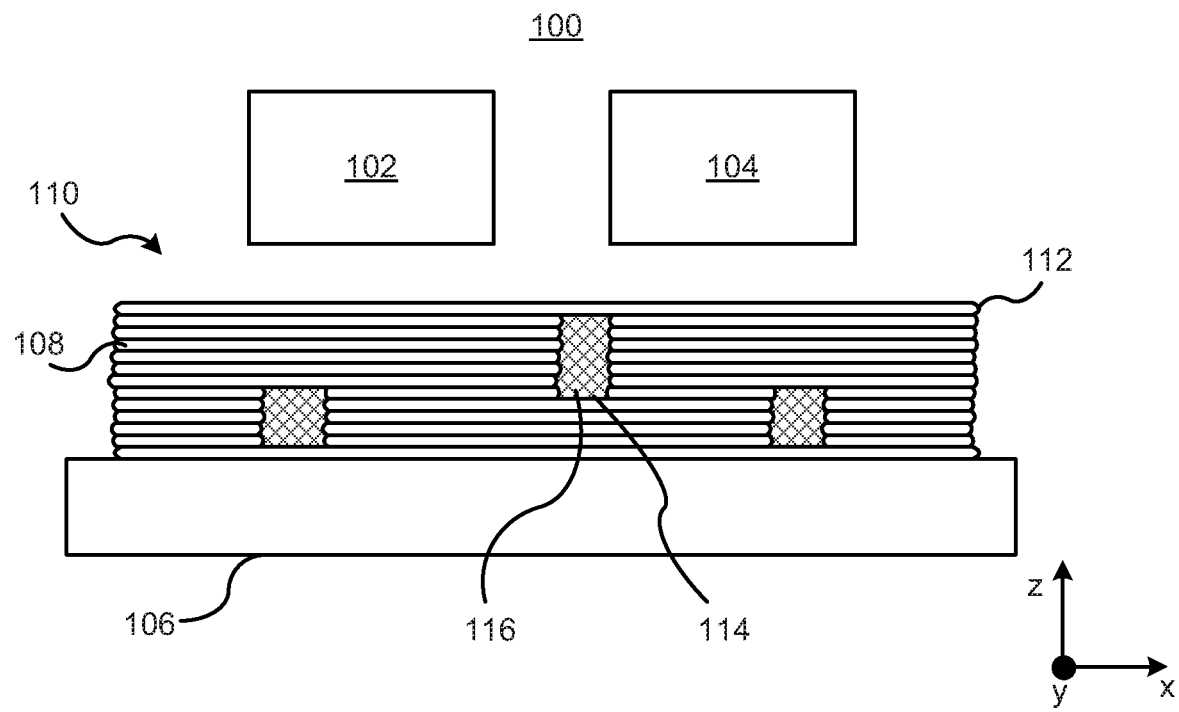
FIG. 1A shows a simplified block diagram of an example three-dimensional (3D) printer for forming a 3D printed object and a simplified cross-sectional view of an example 3D printed object.

With reference first to FIG. 1A, there are shown a simplified block diagram of an example three-dimensional (3D) printer 100 for forming a 3D printed object 110 and a simplified cross-sectional view of an example 3D printed object 110. It should be understood that the 3D printer 100 depicted in FIG. 1A may include additional components and that some of the components may be removed and/or modified without departing from a scope of the 3D printer 100 disclosed herein.

The 3D printer 100 is depicted as including a first material deposition apparatus 102 and a supporting element insertion apparatus 104. Generally speaking, the first material deposition apparatus 102 and the supporting element insertion apparatus 104 may be employed to print or form a 3D printed object 110 on a build area platform 106. That is, the first material deposition apparatus 102 may be implemented to form a plurality of layers 112 of a first material 108. In addition, channels 114 that extend through multiple ones of the plurality of layers 112 may be formed and the supporting element insertion apparatus 104 may be employed to insert a supporting element 116 into the channels 114 formed in the layers 112 of the first material 108.

According to an example, the first material 108 may be a polymer and the first material deposition apparatus 102 may be an apparatus that is to deposit or print the first material 108. For instance, the first material deposition apparatus 102 may perform fused deposition modeling (FDM) to deposit or print the first material 108 into the layers 112. In this example, the first material deposition apparatus 102 may receive a feedstock of the polymer in a solid form, may partially melt the feedstock, and may force a smaller diameter portion of the melted polymer to be extruded through a nozzle (not shown) and onto the build area platform 106 or a previously deposited layer 112 of the first material 108. The first material deposition apparatus 102 and/or the build area platform 106 may be moved with respect to each other in the x, y, and/or z directions to enable the first material deposition apparatus 102 to deposit the layers 112 of the first material 108 on desired locations to form the 3D printed object 110.

In this example, the first material deposition apparatus 102 may be movable in at least the x and y directions such that first material deposition apparatus 102 may deposit the first material 108 in predetermined locations with respect to the build area platform 106. In addition, as the first material deposition apparatus 102 deposits the first material 108 into the layers 112, the first material deposition apparatus 102 may form the channels 114 in multiple ones of the layers 112 and in multiple locations of the 3D printed part 110 as shown in FIG. 1A.

In another example, the first material deposition apparatus 102 may be a delivery mechanism for delivering a fusing agent onto a powder bed. In this example, multiple layers 112 of the first material 108 may be formed such that the locations in which the channels 114 are to be formed do not receive the fusing agent. Instead, the locations at which the channels 114 are to be formed may be supplied with a fusing agent and/or may be supplied with a detailing agent, such as a cooling liquid, to prevent the powder in those locations from being fused together when energy from a fusing lamp (not shown) is applied to those locations. In addition or alternatively, the 3D printer 100 may include a mechanism (not shown) for forming the channels 114 in the formed layers 112. The mechanism may include, for instance, a drill bit or an auger that is able to remove the loose or fused powder to form the channels 114.

In the examples above, the channels 114 may be formed to have any suitable cross-sectional shape along the x-y directions, including circular, rectangular, triangular, etc. The channels 114 may, however, be formed to have sufficiently large widths to accommodate for the viscosities of the second material in examples in which the second material is inserted in liquid or gel form. In addition, as shown in FIG. 1A, the sides of the channels 114 may have ridges, which may be formed during the deposition of the layers 112 or may be formed through a boring operation performed on multiple ones of the layers 112. In one regard, the ridges in the channels 114 may enable for the supporting elements 116 to provide greater structural support to the layers 112 over which the supporting elements 116 extend.

The supporting element insertion apparatus 104 may insert the supporting elements 116 into the channels 114 following the formation of the channels 114. For instance, the supporting element insertion apparatus 104 may insert the supporting elements 116 into the channels 114 prior to a layer (or layers) 112 that covers the channels 114 from being formed over the channels 114. The supporting elements 116 may be formed of a second material that differs from the first material 108. For instance, the second material may be a plastic, a rubber, a metal, an epoxy, a glue, etc., material. Generally speaking, the supporting elements 116 may be formed of a material that is of sufficient strength to enhance the structural integrity of the 3D printed object 110 in the z-direction, e.g., in the direction that is perpendicular to the direction in which the layers 112 of the first material 108 are formed. For example, the second material may be relatively stronger and/or more rigid than the first material 108.

According to an example, the supporting element insertion apparatus 104 may insert the supporting elements 116 into the channels 114 while the supporting elements 116 are in a fluid state. In this example, the supporting element insertion apparatus 104 may include an inserting mechanism (not shown) through which the supporting element insertion apparatus 104 may insert the supporting elements 116 in their liquid states into the channels 114. In addition, the supporting elements 116 may harden following insertion of the supporting elements 116 into the channels 114. For instance, the supporting elements 116 may be formed of a material that is to harden after exposure to sufficient levels of heat, to light, and/or to air.

According to another example, the supporting elements 116 may be in a solid form when the supporting element insertion apparatus 104 inserts the supporting elements 116 into the channels 114. In this example, the supporting elements 116 may be formed of elongated members, such as rods, and the supporting element insertion apparatus 104 may include an inserting mechanism (not shown) that is to drive the supporting elements 116 into their respective channels 114. The rods may be formed of a relatively rigid material such as plastic, metal, an alloy, etc. The supporting elements 116 may be friction fit into the channels 114. In addition, or alternatively, the supporting element insertion apparatus 104 may apply an adhesive to the supporting elements 116 as the supporting elements 116 are inserted into the channels 114 such that the adhesive bonds the supporting elements 116 to the walls of the channels 114. In a further example, the supporting elements 116 may include helical grooves and supporting element insertion apparatus 104 may apply a screwing or rotating action on the supporting elements 116 to drive the supporting elements 116 into the channels 114. In a still further example in which the channels 114 are not formed prior to insertion of the supporting elements 116, insertion of the supporting elements 116 may displace or remove part of the first material 108 to form the channels 114.

Figure 1B:
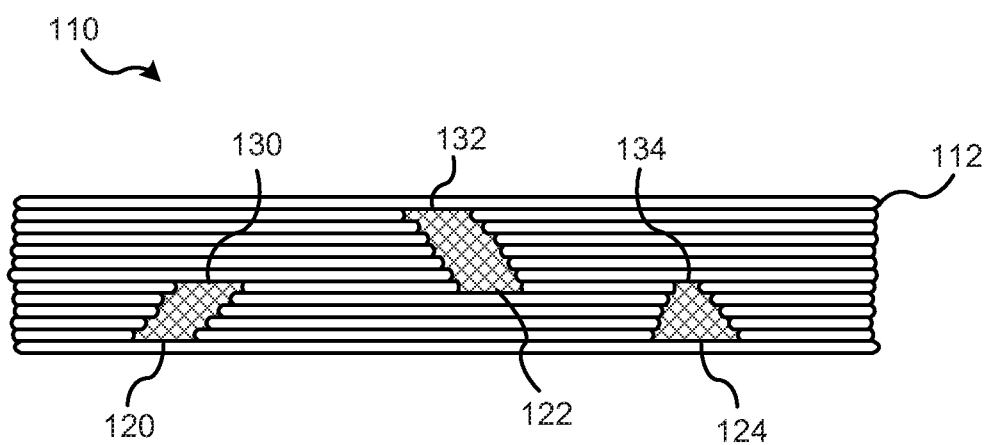
FIG. 1B shows a cross-sectional side view of the 3D printed object depicted in FIG. 1A in which other example configurations of the channels and the supporting elements are depicted.

With reference now to FIG. 1B, there is shown a cross-sectional side view of the 3D printed object 110 depicted in FIG. 1A in which other example configurations of the channels and the supporting elements are depicted. The 3D printed object 110 depicted in FIG. 1B differs from the 3D printed object 110 depicted in FIG. 1A in that the channels 120-124 are configured differently as compared with the channels 114 depicted in FIG. 1B. In this regard, FIG. 1B depicts a few alternate channel configurations in which supporting elements 130-134 may be inserted. It should be understood that the alternate channel configurations shown in FIG. 1A are not exhaustive and that other channel configurations may be implemented without departing from a scope of the present disclosure.

The 3D printed object 110 is depicted in FIG. 1B as including a plurality of channels 120-124 and a plurality of supporting elements 130-134 that have been inserted into the channels 120-124. As shown, a first channel 120 and the second channel 122 are depicted as extending at angles with respect to the y-axis. That is, for instance, the first and second channels 120 and 122 are depicted as extending diagonally with respect to the y-axis. As also shown, a third channel 124 is depicted as having a larger bottom section as compared with a top section of the channel 124. In each of the channels 120-124, a respective supporting element 130-134 may be inserted in any of the manners discussed above with respect to FIG. 1A. In one regard, the channels 120-124 may be formed to have configurations other than vertical, for instance, to provide greater strength to the 3D printed part 110. In another regard, the channels 120-124 may be formed to have other configurations to enable the supporting elements 130-134 to be provided in portions of 3D printed parts that are curved or have other shapes.

By way of particular example, the channels 120-124 may be formed to have fixed dimensions. For instance, a channel 120 may be 1 mm×1 mm in the x and y directions and 4 mm in the z direction. In addition, the channels 120-124 may be formed such that they are offset from each other in the z direction. For instance, a first channel 120 may start 1 mm from the bottom of the 3D printed part 110, a second channel 122 may start 2 mm from the bottom, the third channel 124 may start 3 mm from the bottom, a fourth channel (not shown) may start at 2 mm from the bottom, and so forth. According to example, the channels 120-124 may be staggered with respect to each other such that each layer 112 has multiple channels 120-124.

Figure 2:
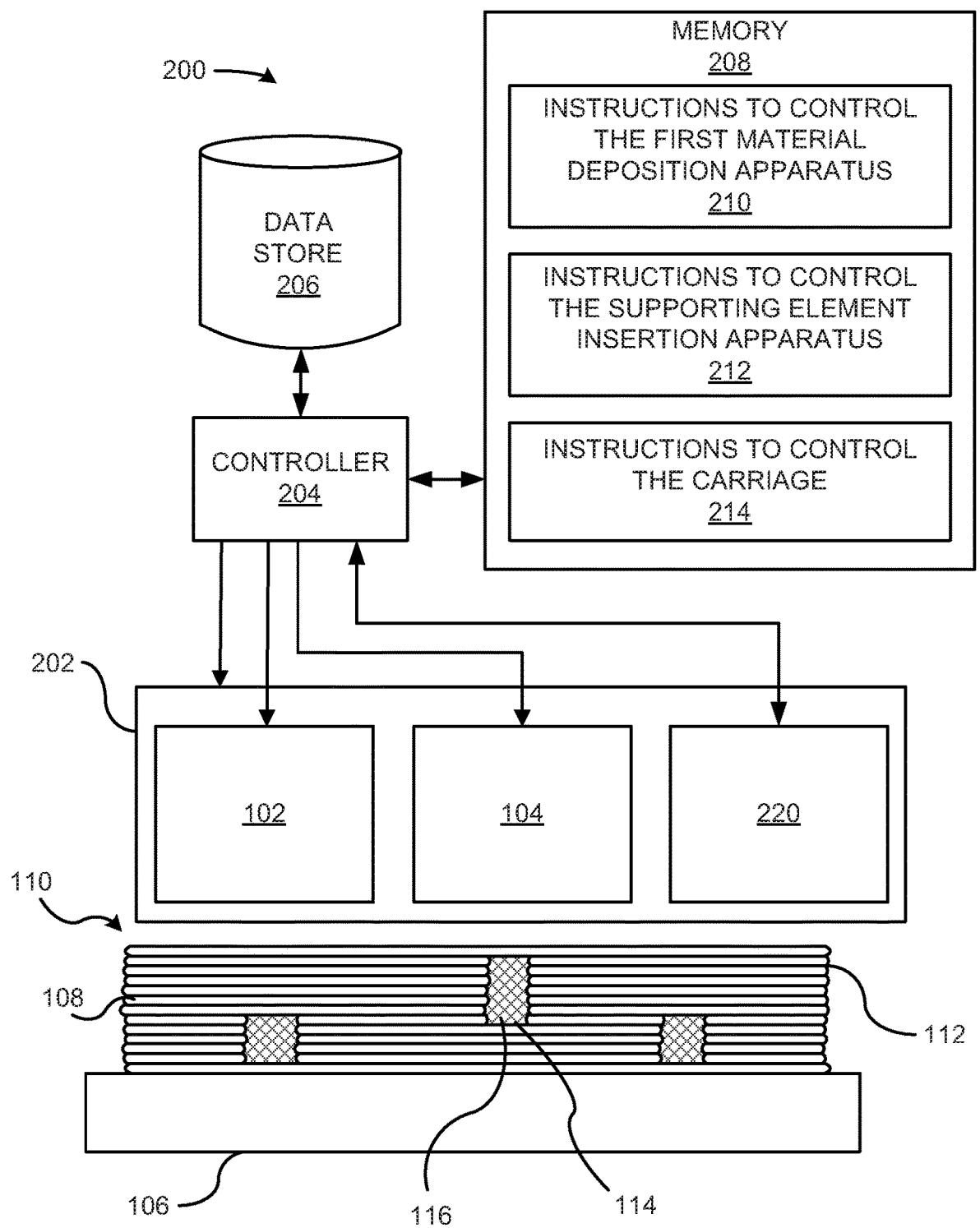
FIG. 2 shows a simplified block diagram of another example 3D printer and a simplified cross-sectional side view of the example 3D printed object depicted in FIG. 1A.

Turning now to FIG. 2, there are shown a simplified block diagram of another example 3D printer 200 and a simplified cross-sectional side view of the example 3D printed object depicted in FIG. 1A. The 3D printer 200 is depicted as including the first material deposition apparatus 102 and the supporting element insertion apparatus 104 depicted in FIG. 1A. In addition, in the 3D printer 200, the first material deposition apparatus 102 and the supporting element insertion apparatus 104 are depicted as being arranged on a carriage 202. The 3D printer 200 is further depicted as including a controller 204 that may control operations of the 3D printer 200, a data store 206 that may include data pertaining to a 3D part to be printed by the 3D printer 200, and a memory 208 that may store instructions that the controller 204 is to execute in controlling the operations of the 3D printer 200.

The controller 204 may be a computing device, a semiconductor-based microprocessor, a central processing unit (CPU), an application specific integrated circuit (ASIC), and/or other hardware device. As shown, the controller 204 may control each of the first material deposition apparatus 102, the supporting element insertion apparatus 104, and the carriage 202. Particularly, for instance, the controller 204 may control actuators (not shown) that are to move and/or activate the first material deposition apparatus 102, the supporting element insertion apparatus 104, and the carriage 202 based upon, for instance, the instructions stored in the memory 208 and the data stored in the data store 206.

The data store 206 may store data pertaining to the locations at which the first material 108 is to be deposited, the locations at which the channels 114 are to be formed, the timing at which the supporting elements 116 are to be inserted into the channels 114, etc. In addition, the controller 204 may execute the instructions 210 to control the first material deposition apparatus 102 to cause the first material 108 to be deposited and the channels 114 to be formed, the instructions 212 to control the supporting element insertion apparatus 212 to cause the second material to be inserted to form the supporting elements 116, and the instructions 214 to control the carriage 214 to position the first material deposition apparatus 102 and the supporting element insertion apparatus 104 at desired locations during the material deposition and insertion processes.

The memory 208 may be any electronic, magnetic, optical, or other physical storage device that contains or stores executable instructions. Thus, the memory 208, which may also be construed as a machine-readable storage medium, may be, for example, Random Access Memory (RAM), an Electrically Erasable Programmable Read-Only Memory (EEPROM), a storage device, an optical disc, and the like. The memory 208 (machine-readable storage medium) may be a non-transitory machine-readable storage medium, where the term "non-transitory" does not encompass transitory propagating signals.

Additionally, the 3D printer 200 is depicted as including a sensing system 220 that may also be supported on the carriage 202. According to an example, the sensing system 220 may include any of an imaging system, a sonar system, a light detection and ranging (LIDAR) system, or the like, that may sense physical conditions of the layers 112 of first material 108. Generally speaking, the sensing system 220 may sense the physical conditions, e.g., capture images, detect distances, etc., and may communicate the sensed conditions to the controller 204. The controller 204 may, for instance, determine the locations of the channels 114 from the sensed conditions. That is, the controller 204 may determine that a channel 114 is located at a particular location based upon an analysis of a captured image at that location and/or based upon a determination that a detected distance is relatively longer at that location. The use of the sensing system 220 may be considered to be optional in some examples, for instance, in those examples in which the controller 204 tracks the locations at which the channels 114 are formed during the deposition of the first material 108 into the layers 112.

Although the first material deposition apparatus 102, the supporting element insertion apparatus 104, and the sensing system 220 have been depicted as being supported on a carriage 202, it should be understood that these components may be supported on separate carriages or may otherwise be independently movable with respect to each other without departing from a scope of the present disclosure.

Various manners in which the 3D printer 100, 200 may be implemented are discussed in greater detail with respect to the methods 300 and 400 respectively depicted in FIGS. 3 and 4. It should be apparent to those of ordinary skill in the art that the methods 300 and 400 may represent generalized illustrations and that other operations may be added or existing operations may be removed, modified, or rearranged without departing from the scopes of the methods 300 and 400.

The descriptions of the methods 300 and 400 are made with reference to the 3D printers 100 and 200 illustrated in FIGS. 1 and 2 for purposes of illustration. It should, therefore, be understood that 3D printers having other configurations may be implemented to perform either or both of the methods 300 and 400 without departing from the scopes of the methods 300 and 400.

Prior to execution of either of the methods 300 and 400 or as part of the methods 300 and 400, the controller 204 may execute instructions (not shown) stored in the memory 208 to access data pertaining to a 3D part 110 that is to be printed. By way of example, the controller 204 may access data stored in the data store 206 pertaining to the 3D part 110 that is to be printed. The controller 204 may determine, for instance, the placements at which the channels 114 are to be formed in the layers 112 of the first material 108 and the timings at which the supporting elements 116 are to be inserted into the channels 114. In other examples, however, a processing device (not shown) outside of the 3D printer 100 may execute instructions to access the 3D part 110 data and to determine the placements at which the channels 114 are to be formed in the layers 112 and the timings at which the supporting elements 116 are to be inserted into the channels 114. In these examples, the processing device may communicate this information to the controller 204 and the controller 204 may implement this information in executing either of the methods 300 and 400.

With reference first to FIG. 3, at block 302, a plurality of layers 112 of the 3D printed object 110 and a channel 114 that extends through the layers 112 may be formed. As discussed above, the controller 204 may control the first material deposition apparatus 102 to form the plurality of layers 112 while also forming the channel 114. In addition, the channel 114 may be formed to extend vertically through the plurality of layers 112 or at various angles as discussed above with respect to FIG. 1B. According to an example, the controller 204 may determine the location at which the channel 114 is to be formed prior to forming the channel 114. In one example, the controller 204 may determine the location to be location that is sufficiently distant from edges of the 3D printed part 110 to prevent the structural element 116 from creating artifacts on an exterior surface of the 3D printed part 110, while also providing a desired level of structural support to the 3D printed part 110.

At block 304, a supporting element 116 may be inserted into the channel 114 such that the supporting element 116 extends through multiple layers of the plurality of layers 112. The controller 204 may control the supporting element insertion apparatus 104 to insert a second material in liquid, gel, and/or solid form into the channel 114. In addition, the supporting element 116 may be formed of material that differs from the first material. For instance, the supporting element 116 may be formed of a material that is significantly stronger and/or harder than the first material when the second material is hardened.

Blocks 302 and 304 may be repeated at various locations with respect to the 3D printed part 110 to thus form a plurality of channels 114 in a plurality of layers 112 and to insert a plurality of supporting elements 116 into the channels 114. In this regard, the supporting elements 116 may provide additional structural support to the 3D printed part 110.

With reference now to FIG. 4, at block 402, a plurality of layers 112 of the 3D printed object 110 may be formed while a channel 114 that extends through the layers 112 is formed in any of the manners discussed above.

At block 404, a location of the channel 114 may be determined. In one example, the controller 204 may determine the location of the channel 114 based upon a known location of the channel 114 as the channel 114 was formed. In another example, the sensing system 220 may be maneuvered with respect to the printed layers 112 and the sensing system 220 may output sensed data to the controller 204. In addition, the controller 204 may analyze the sensed data to determine the location of the channel 114. According to an example, the controller 204 may access data pertaining to a characteristic of the channel 114, in which the characteristic may include a location of the channel 114, an orientation of the channel 114, a size of the channel, and the like.

Figure 5:
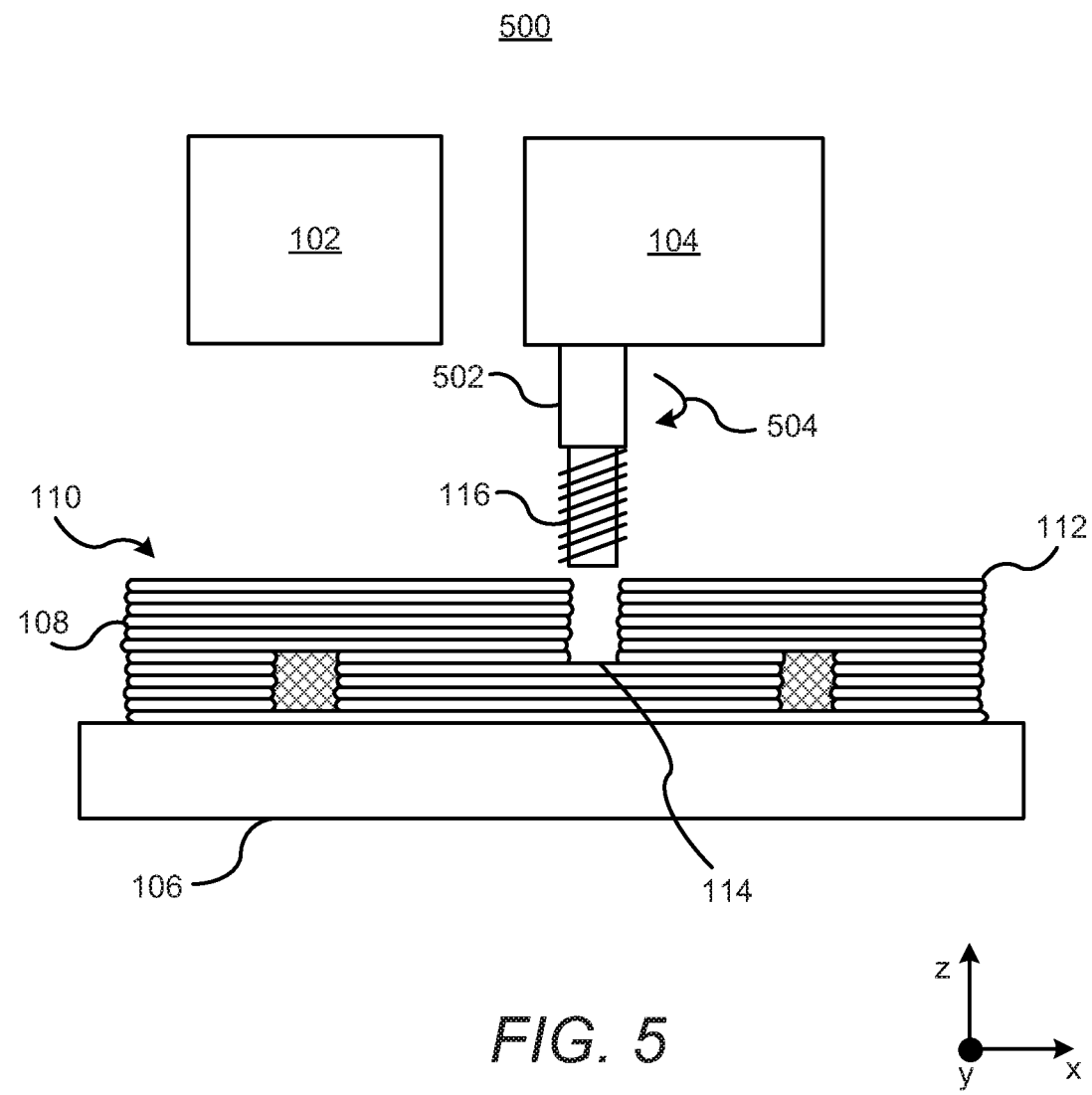
FIG. 5 shows a simplified block diagram of another example 3D printer and a simplified cross-sectional side view of the example 3D printed object depicted in FIG. 1A.

At block 406, a supporting element 116 may be inserted into the located channel 114. As discussed above, the controller 204 may control the supporting element insertion apparatus 104 to insert the supporting element 116 into the channel 114, in which the supporting element 116 is formed of a second material that differs from the first material. By way of particular example, the supporting element 116 may be a relatively rigid elongated member, such as a plastic or metal rod, and the supporting element insertion apparatus 104 may drive the supporting element 116 into the channel 114. Similarly, as shown in FIG. 5, which depicts a simplified block diagram of another example 3D printer 500 and a simplified cross-sectional side view of the example 3D printed object depicted in FIG. 1A, the supporting element 116 may include helical grooves and may be inserted into the channel 114 through a rotating and/or screwing action. That is, the supporting element insertion apparatus 104 may include a rotating element 502 that may engage the supporting element 116. In addition, the supporting element insertion apparatus 104 may insert the supporting element 116 into the channel 114 by causing the rotating element 502 to rotate as depicted by the arrow 504 and driving the supporting element 116 down in the negative z-direction.

At block 408, a determination may be made as to whether additional layers 112 are to be formed. For instance, the controller 204 may determine that additional layers 112 are to be formed on top of the layers 112 in which the channel 114 has been formed. In response to a determination that additional layers are to be formed, blocks 402-404 may be repeated to position supporting elements 116 at multiple locations along the height of the 3D printed part 110. However, in response to a determination at block 408 that no additional layers are to be formed, the method 400 may end as indicated at block 410.

Some or all of the operations set forth in the methods 300 and 400 may be contained as utilities, programs, or subprograms, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for forming a three-dimensional (3D) printed object, said method comprising:
   forming, by a 3D printing device, a plurality of layers of the 3D printed object and a channel that extends through the plurality of layers, wherein the plurality of layers is formed of a first material;
   identifying, by a sonar system or a light detection and ranging (LIDAR) system in the 3D printing device a specific location within the plurality of layers where the channel is located; and
   inserting, by an insertion apparatus in the 3D printing device, a supporting element into the channel at the identified specific location, wherein the supporting element extends through multiple layers of the plurality of layers, and wherein the supporting element is formed of a second material that differs from the first material.

2. The method according to claim 1, wherein inserting the supporting element further comprises inserting the supporting element while the supporting element is in a fluid state, and wherein the supporting element is to harden alter the supporting element has been inserted into the channel.

3. The method according to claim 1, wherein the supporting element is a solid, elongated member and wherein inserting the supporting element further comprises inserting the supporting element to be frictionally fit into the channel.

4. The method according to claim 1, wherein the supporting element is a solid, elongated element and wherein inserting the supporting element further comprises inserting the supporting element with an adhesive into the channel.

5. The method according to claim 1, wherein the supporting element has helical grooves and wherein inserting the supporting element further comprises inserting the supporting element through application of a screwing action on the supporting element.

6. The method according to claim 1, further comprising:
forming another plurality of layers while forming another channel that extends through the another plurality of layers, wherein the another plurality of layers is formed of the first material, and wherein the another channel is offset with respect to the channel;
identifying, by the sonar system or the light detection and ranging (LIDAR) system, a particular location within the another plurality of layers where the another channel is located; and. inserting another supporting element into the another channel at the identified particular location, wherein the another supporting element extends through multiple layers of the another plurality of layers, and wherein the another supporting element is formed of the second material.

7. The method according to claim 1, wherein forming the plurality of layers is performed by a first material deposition apparatus in the 3D printing device, wherein the first material deposition apparatus is separate from the insertion apparatus that inserts the support element.

8. The method according to claim 1, wherein forming the plurality of layers further comprises forming the plurality of layers through fused deposition modelling printing.

9. A method comprising:
forming by a three-dimensional (3D) printing device, a plurality of layers of a first material and a channel formed within the plurality of layers, wherein the first material is to form part of a 3D printed object;
identifying, by a sonar system or a light detection and ranging (LIDAR) system in the 3D printing device, a specific location within the plurality of layers where the channel is located; and
controlling a supporting element insertion apparatus to:
move to the identified specific location of the channel; and
insert a supporting element into the channel at the identified specific location, the supporting element being formed of a second material that differs from the first material.

* * * * *